June 11, 1940.    H. D. SOLOMON ET AL    2,203,931
SLIDING TOP
Filed April 11, 1938    2 Sheets-Sheet 2
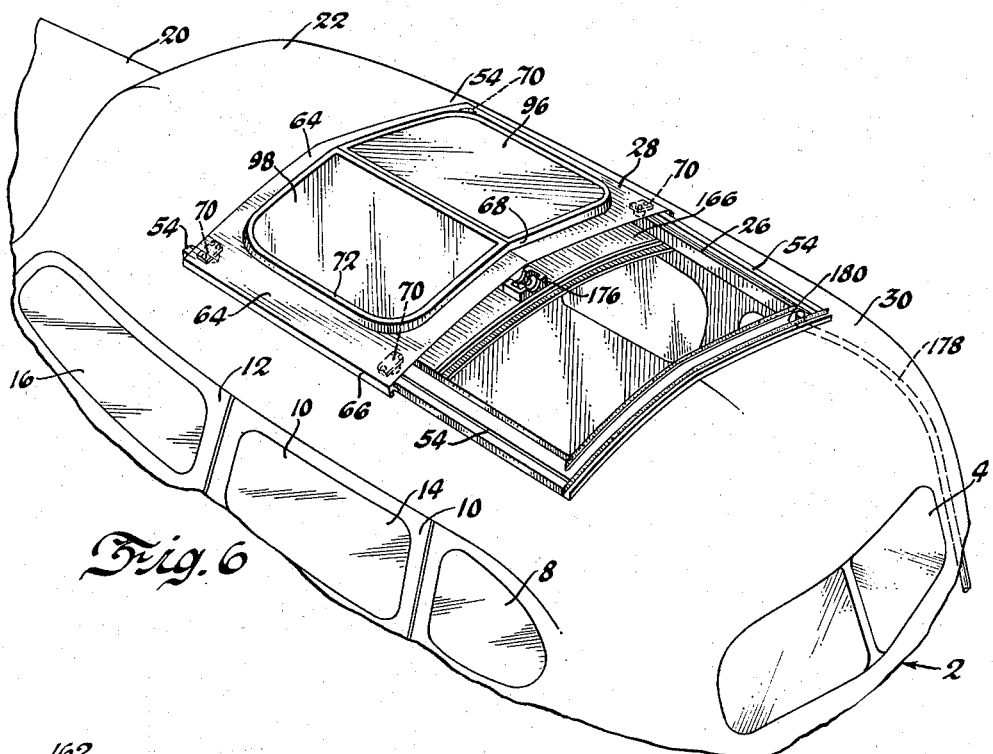
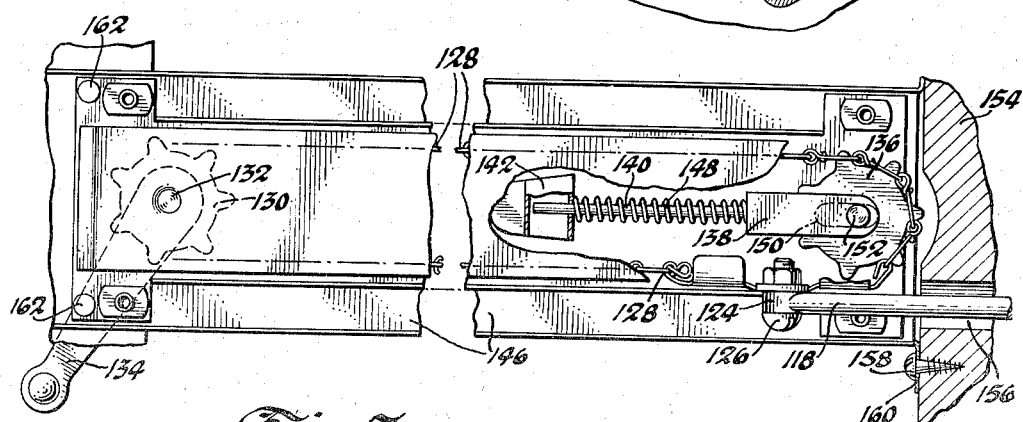
Inventors
Harry D. Solomon &
Frank Humer
By Blackmore, Spencer & Flint
Attorneys Patented June 11, 1940

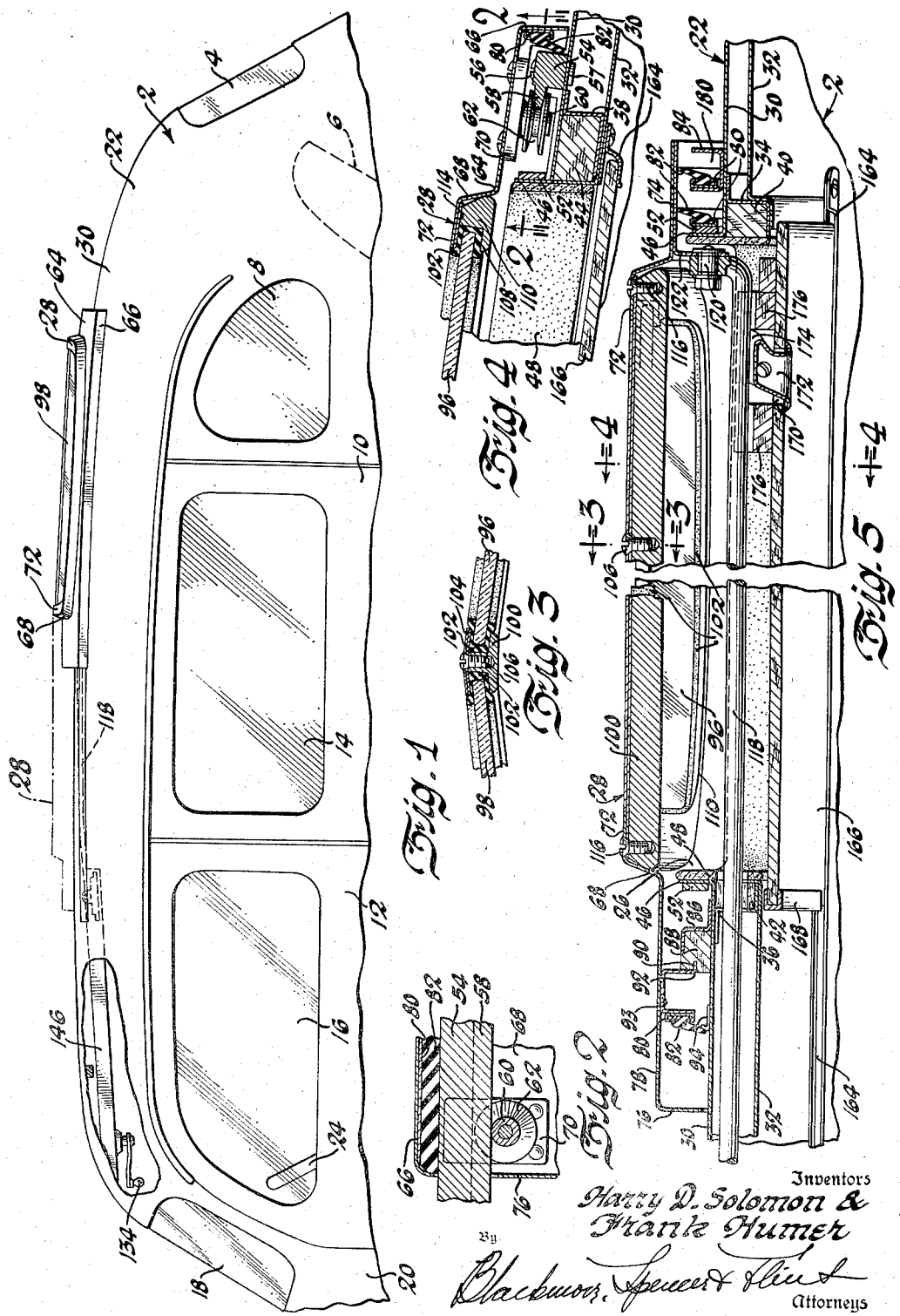

2,203,931

UNITED STATES PATENT OFFICE 2,203,931

SLIDING TOP

Harry D. Solomon and Frank Humer, Detroit, Mich., assignors to Ternstedt Manufacturing Company, Detroit, Mich., a corporation of Michigan Application April 11, 1938, Serial No. 201,260

2 Claims. (Cl. 296—137)

This invention relates to automotive vehicles and has particular reference to a sliding top applied to the roof of the vehicle.

Sliding tops are old and the present invention relates to specific improvements in details of the sliding top and its interrelation or connection with the roof of the vehicle.

The principal novel features relate to the rails at the sides of the roof, the rails having a track portion which projects toward the roof opening and on the track portions rollers working on a vertical axis are adapted to slide to hold the sliding top in adjusted position and to guide it in its travel over and away from the roof opening. Other specific improvements relate to the manner of making weathertight joints between the sliding top and the roof when the sliding top is in closed position. A still further improvement relates to a slide or sunshield on the inside of the roof so that when the sliding top is closed, the slide may be pulled over the top to exclude light passing through the windows in the sliding top. A further improvement in the roof resides in applying two windows to an inverted V-shaped sliding roof.

On the drawings

Figure 1 is a side view of a part of the automobile body showing the invention applied.

Figure 2 is a section on the line 2—2 of Figure 4.

Figures 3 and 4 are sections on the lines 3—3 and 4—4 of Figure 5.

Figure 5 is a longitudinal sectional view through the middle of the vehicle taken through the sliding top and the roof.

Figure 6 is a perspective view from the top showing the roof in open position and the sunshield slide therebeneath in partial open position.

Figure 7 is an enlarged detailed view of the mechanism for sliding the top, parts being broken away for purposes of clearer illustration.

Referring to the drawings, the numeral 2 indicates the body of the automotive vehicle. The vehicle has the rear window 4, the rear seat 6, the rear quarter window 8, rear door 10, front door 12, rear door window 14, front door window 16, windshield 18, cowl 20, and roof 22. The usual steering wheel is indicated at 24. The roof 22 is provided with an opening 26 best shown in Figure 6. Over the opening 26 the sliding top 28 of the invention is adapted to slide.

As is best shown in Figure 5, the roof 22 comprises the upper or outer steel member 30 and the inner steel member 32 spaced therefrom. Around the opening 26 the roof elements 30 and 32 are supported by the Z-shaped element 34 at the rear of the opening, the Z-shaped element 36 at the front of the opening, and the Z-shaped elements 38 at the sides of the opening. These Z-shaped elements have one flange secured to the underside of the upper steel member 30 and the other flange secured to the side of the lower steel member 32. Suitable wood fillers 40, 42, and 44 are provided at the rear, front, and sides of the opening, respectively, and fill in the space between the lower flange of the Z elements and the upper roof member 30.

Surrounding the opening 26 the metal of the roof 30 is upwardly bent as indicated at 46, and secured to the members 40, 42, 44, and 46 and surrounding the entire inside of the roof opening is the reinforcing and finishing trim strip 48 which extends from the top of the opening or the top of the flange 46 downward to the inner sheet metal member 32 of the roof.

Entirely around the opening 26 and secured to the outside of the flange 46 a wood or metal strip 52 is secured. As is best seen in Figure 5 the elements 46, 48, and 52 form an upwardly extending projection which extends entirely around the roof opening 26. The purpose of this projection is to prevent the entrance of any rain from the outside.

Referring to Figures 2, 4, and 5, at each side of the vehicle and spaced from the member 52, rails 54 are secured to the sides of the vehicle. One rail is secured to each side and extends at least twice the length of the opening 26. The rails are secured to the upper steel member 30 of the roof by means of the machine screws 56, the ends of which are threaded into a bar 57 on the underside of the roof 30. Each rail 54 has a relatively thin track 58 which projects toward the opening 26.

On the sliding top 28 at the edge thereof, rollers 60 are mounted. These rollers turn on a substantially vertical pivot and are grooved as indicated at 62. The track 58 of the rails 54 is adapted to be received in the groove 62 and the interconnection between the rollers 60 and the track 58 holds the roof in position and guides it in its sliding movements. There are four rollers 60, one at each corner of the sliding top.

The sliding top itself comprises the outer metallic frame 64, the cross sectional shape of which at the side of the vehicle is best shown in Figure 4. This top has the downwardly extending edge flange 66 and an upwardly extending flange 68 adjacent the opening 26. The flanges 66 and 68 are connected by a slightly inclined part on which are secured the base members 70 for mounting the rollers 60. The sliding top at the opening 26 terminates in an inwardly extending flange 72.

At the rear of the vehicle there is no flange corresponding to the flange 66 at the side of the vehicle, but the remaining construction is substantially the same, with the exception that the part 74 shown in Figure 5 is arched to accommodate the arched roof 22.

At the front of the vehicle the sliding top has the downwardly turned flange 76 and the relatively wide arched part 78. The part 78 terminates in the flange 68.

Referring to Figure 5 at the right hand end of the figure, the structure for forming a weathertight connection is shown. A substantially C-shaped metal retaining member 80 is secured to the metal strip 52. This C-shaped member extends entirely the width of the vehicle and has secured therein the rubber or fabric element 82 of the shape shown in the figure. Spaced somewhat from the member 52 a U-shaped channel 84 is secured to the roof 22 and at the inside of one of the flanges of the member 84 a second C-shaped member 80 is secured. In this C-shaped member 80 a second rubber or fabric member 82 is secured. The rubber or fabric members 82 have a finger or lip thereon as shown, which project upwardly and are adapted to contact with the underside of the part 74 of the sliding top when the top is in closed position to form a weathertight joint.

At the front of the sliding top a Z-shaped angle iron 86 has one flange thereof secured to the roof and a wooden strip 88 is held to the roof by the second flange of the member 86. This wooden strip 88 has a groove 90 formed therein in which there is adapted to be received the flange 92 which is formed on the end of one of the flanges of a U-shaped transversely extending member 93 secured to the underside of the sliding roof. At the forwardmost flange of the member 92 a C-shaped iron 80 is secured, and in the C-shaped member 80 a rubber or fabric member 82 is secured. This rubber member 82 has a downturned lip similar to the members 82 at the rear of the vehicle, and in the closed position of the sliding top the lip is adapted to bear tightly against the upturned flange of an iron 94 secured to the member 30 of the roof.

At the sides of the vehicle the downturned flange 66 has a C-shaped retaining member 80 secured on the inside thereof and in the retaining member 80 a rubber or fabric weatherstrip 82 is secured. The weatherstrip 82 has a lip similar to the members 82 shown in Figure 5 and this lip bears firmly against the outside edge of the rails 54 to form a weathertight joint as is best shown in Figure 2.

The sliding top 28 is of slightly inverted V shape in cross section and to close the opening therein two windows 96 and 98 are provided. At their middle the windows are supported on a ledge or rib 100 which has outstanding flanges to receive the rubber or fabric window receiving channels 102. Over the channels 102 the double metallic strips 104 are positioned. The strips 104 are held to the rib 100 by means of the machine screws 106. At the sides and the front of the opening in the frame 64 the windows 96 and 98 are supported on the flange 108 of the frame members 110. On the flange 108 the U-shaped rubber or fabric window receiving channels 102 are supported and a metal retaining member 114 secures the fabric or rubber elements 102 in place. The windows 96 and 98 and their frames are held to the sliding top 28 by means of machine screws 116 which pass through the flange 72 and into the frame members 100 and 110 of the window frame.

In order to move the sliding top 28 a relatively long rod 118 is fastened at its rear end by means of a bolt and nut 120 to a downturned flange 122 on a reinforcing member secured to the underside of the rear part 74 of the roof. This rod 118 extends forwardly and has its forward end 124 (see Figure 7) secured by means of a bolt and nut 126 to an endless chain 128. The endless chain operates around two sprockets, a front stationary sprocket 130 mounted on the shaft 132 which is operated by a handle 134 accessible to the driver of the vehicle, and a rear sprocket 136 mounted in a U-shaped stirrup 138 secured to the end of a rod 140, guided in a bracket 142, secured to the frame 146 of the mechanism shown in Figure 7. The bracket 142 has an opening to receive the end of the rod 140 and between the bracket 142 and the stirrup 138 a coil spring 148 is under compression constantly to urge the stirrup 138 and its sprocket 136 to the right when considering Figure 7. The frame 146 is provided with a suitable slot 150 to accommodate the shaft 152 of the sprocket 136. It will be apparent from the structure of Figure 7 that by turning the crank 134 in a clockwise direction the chain 128 will be moved to pull the rod 118 toward the front of the vehicle and at the same time cause the sliding top 28 to move to uncover the opening 26 in the roof.

The mechanism of Figure 7 is secured flatwise against the underside of the roof over the driver's seat as shown in Figure 1. At the rear of the mechanism a wooden support 154 is secured to the roof and this support 154 is provided with an opening 156 through which the rod 118 passes. Suitable screws 158 passing through flanges 160 secure the mechanism to the support 154. At the front of the vehicle the securing members 162 secure the mechanism to the roof.

Referring to Figure 5, inside at each side of the vehicle the U-shaped guiding tracks 164 are provided. One track 164 is positioned at each side. These tracks are adapted to receive and guide a light opaque slide 166 the forward end of which is reinforced by means of a U-shaped reinforcing iron 168. The slide 166 has an opening 170 at the rear thereof and in the opening 170 a recessed handle part 172 is positioned to enable the operator to place his hand therein to slide the slide forwardly away from or rearwardly across the opening in the top. The handle 172 is positioned at the middle of the slide 166 and is provided with a recessed portion 174 to allow the rod 118 to pass thereover. The rod 118 is likewise positioned at the middle of the vehicle. At the upper side of the slide 166 are suitable reinforcing members 176 to reinforce the slide around the opening 170.

The operation of the structure is as follows: The closed position of the sliding top is shown in Figure 5. In this position the weatherstrips or rubber elements 82 at the rear, front, and sides of the vehicle are all in contact with their respective abutments so that a weathertight connection is provided. The sliding panel 166 is also shown over the opening and this will exclude any light which may be coming from the outside such as when the occupant of the vehicle is driving at noontime with the sun directly over head. Where the amount of sunlight is not objectionable, the panel 166 may be moved forwardly of the vehicle, or to the left from the position shown in Figure 5, to allow light to enter through the windows 96 and 98 of the top. Where the weather is severely cold or during a rain storm the occupant of the vehicle will be allowed a view of the objects visible over the roof of the vehicle because of the windows 96 and 98, without being subject to inconveniences of weather. When the weather permits, the top 28 can be slid forwardly completely to uncover the opening 26. This can be done by the driver operating the handle 134 to cause the mechanism of Figure 7 to pull the sliding top forward to uncover the opening. An unobstructed view of objects over the roof of the vehicle is now assured. To shift the sliding top 28 over the opening 26, the handle 134 is operated in the opposite direction.

In Figure 6 a rain pipe 178 is shown. If desired, a similar rain pipe may be used at the opposite side of the vehicle. The object of this pipe is to drain from the groove 180 between the U-shaped member 84 and the upstanding flange 52 any water which may accumulate therein.

We claim:

1. In a vehicle body having a roof with an opening therein, a sliding top shiftable to expose or to close the opening, a strip of rubber secured to the sliding top, a sealing member secured to the sliding top and spaced from the first strip, and separate means on the roof engageable by the rubber strip and the sealing member to form a weather-tight connection at one end of the sliding top when the top is in closed position.

2. In a vehicle body having a roof with an opening therein, a sliding top shiftable to expose or to close the opening, a strip of rubber secured to the sliding top, a sealing member secured to the sliding top and spaced from the first strip, separate means on the roof engageable by the rubber strip and the sealing member to form a weather-tight connection at one end of the sliding top when the top is in closed position, and a downturned flange on the edge of the sliding top beyond the seals to form a rain and wind break for the weather-tight connection.

HARRY D. SOLOMON.
FRANK HUMER.